Patented June 17, 1952

2,601,203

UNITED STATES PATENT OFFICE 2,601,203

DECOLORIZING CAUSTIC SODA SOLUTIONS

Wallis R. Bennett and Claude A. Cummins, Midland, Mich., assignors to The Dow Chemical Company, Midland, Mich., a corporation of Delaware No Drawing. Application October 10, 1949, Serial No. 120,608

5 Claims. (Cl. 23—230)

This invention relates to a method of decolorizing concentrated aqueous caustic soda solutions derived from the electrolysis of salt brine in diaphragm-type cells.

As is well-known, electrolytic caustic soda produced in diaphragm cells exhibits a decided blue color on being concentrated above about 25 per cent of NaOH by weight. One of the methods currently in use for decolorizing such solutions is to introduce into them a soluble hypochlorite, such as sodium hypochlorite. In carrying out this method, the caustic soda, usually after being cooled on leaving the evaporator, is led into a suitable vessel and then an estimated amount of the decolorizing agent is introduced while the solution is stirred. This procedure, however, is far from satisfactory because it is not possible to gauge accurately in advance the proper amount of decolorizing agent. As a result in many instances either an underdose or overdose of agent is used and the caustic is thus either not fully decolorized or agent is wasted.

The present invention provides a method of decolorizing the caustic soda whereby the process is rendered preferably continuous and the dosage of the decolorizing agent is accurately controlled so that the solution always receives the proper amount to produce decolorization without waste.

The invention is based upon the discovery that the amount of decolorizing agent required to be present in the caustic soda solution to render it just colorless can be ascertained by reference to the EMF developed between an electrode of tungsten and a standard calomel half cell immersed in the caustic soda solution.

We have found that the change in EMF of the tungsten electrode resulting from a change in concentration of hypochlorite in the concentrated caustic soda is quite abrupt through the range of concentration of the hypochlorite in the caustic soda at which the caustic soda solution changes from colored to colorless. The data in the following table is illustrative of the relationship between the voltage readings produced upon adding various amounts of sodium hypochlorite solution (containing 0.033 grams of NaClO per c. c. of solution) to 1000 c. c. samples of 50 per cent caustic soda solutions held at about 60° C.

Table I

| c. c., Added NaClO Solution | Voltage Readings | |
|---|---|---|
| | Sample 1 | Sample 2 |
| 0 | 1.030 | 1.020 |
| 0.1 | 0.985 | 0.967 |
| 0.2 | 0.955 | 0.941 |
| 0.3 | 0.935 | 0.927 |
| 0.4 | 0.923 | 0.917 |
| 0.5 | 0.914 | 0.909 |
| 0.6 | 0.907 | 0.903 |
| 0.7 | 0.901 | 0.898 |
| 0.8 | 0.897 | 0.893 |
| 0.9 | 0.892 | 0.890 |
| 1.0 | 0.889 | 0.887 |
| 1.1 | 0.887 | 0.884 |
| 1.2 | 0.885 | 0.883 |

In obtaining the foregoing data undecolorized electrolytic caustic soda solution produced in diaphragm cells and concentrated to 50 per cent NaOH by vacuum evaporation at about 80°–85° C. was used. A 1000 c. c. sample of the concentrated caustic soda which exhibited a distinct purple color was placed in a 1 liter beaker and the electrodes introduced. One was a tungsten rod 0.1565 inch in diameter and the other a conventional calomel half cell employing an electrolyte of saturated KCl solution. The sodium hypochlorite solution containing 0.033 grams of sodium hypochlorite per c. c. was introduced dropwise into the caustic soda solution from a burette while the solution was stirred and maintained at 60° C. The voltage between the electrodes was read and recorded as the hypochlorite was added, the addition of hypochlorite being continued until more than enough to decolorize the caustic had been added. In each of the runs, the caustic soda was a sample of a different batch but the amount of hypochlorite required to produce decolorization fell in a narrow range, viz. about 0.4 to 0.6 c. c. per 1000 c. c. of caustic soda solution. The corresponding voltage readings were from about 0.900 to 0.925 volt.

In carrying out the invention in large scale continuous operations, satisfactory results are had by introducing the sodium hypochlorite solution into and mixing it with a flowing stream of the concentrated caustic soda solution while hot as it comes from the evaporators. Similar results may be had by forming the hypochlorite in situ by introducing chlorine gas into the caustic soda solution. The electrode pair, i. e. the tungsten and calomel electrodes are arranged to dip into the flowing stream at a point beyond where the hypochlorite is present and mixed with the caustic soda solution. The caustic solution may be at about 60° to 85° C. and at those temperatures the reaction between the hypochlorite and the caustic soda to be decolorized is practically instantaneous so that the voltage readings quickly indicate the proportion of hypochlorite added. The addition of the hypochlorite depresses the voltage sharply over the range of amounts normally required. The voltage reading is thus a sensitive index of the amount of hypochlorite required. In order to maintain the proper rate of hypochlorite introduction to just decolorize the caustic soda, it is sufficient to introduce the hypochlorite in aqueous solution at a rate which maintains the voltage reading at or near the voltage at which it is found decolorization is just achieved.

Different batches of caustic soda may become colorless with the use of different amounts of hypochlorite, hence, it will be desirable, if not necessary from time to time, to ascertain the voltage at which decolorization is just achieved with a given concentration of hypochlorite in the caustic soda. In general, however, the voltage at which the caustic just becomes colorless will be between 0.895 and 0.930 volt when the temperature of the caustic soda is between about 60° and 85° C. and its concentration is about 50 per cent by weight.

In a continuous large scale operation, 50 per cent caustic soda solution at 70° C. flowing at the rate of about 600 tons per day was continuously decolorized without waste of hypochlorite by adding sodium hypochlorite solution (containing about 0.1 gram of NaClO per c. c.) at a rate such that the voltage reading between a tungsten rod and calomel half cell, dipping into the treated caustic soda, was maintained at about 0.92 volt.

If desired, one may arrange to use a voltage reading device which is adapted to control the rate of addition of the bleach solution to the caustic soda so that the operation is automatic. Many conventional devices are available and readily adapted to this use.

Although the invention is exemplified more particularly in connection with the use of sodium hypochlorite as the preferred decolorizing agent, it will be understood that other soluble hypochlorites may be used such as other alkali metal hypochlorites, or the hypochlorite may be produced in situ by adding chlorine gas to the caustic soda. Also, the concentration of the caustic soda with which the method may be practiced may vary widely, as for example from about 25 to 70 per cent.

We claim:
1. In a process of decolorizing a concentrated aqueous solution of electrolytic caustic soda produced in diaphragm cells wherein a soluble hypochlorite is employed in the caustic soda solution to effect decolorization thereof the method of controlling the amount of hypochlorite used which comprises immersing an electrode of tungsten and a reference electrode in the hypochlorite treated caustic so as to produce an EMF which decreases as the concentration of the hypochlorite in the caustic soda solution increases and regulating the concentration of the hypochlorite in the caustic soda solution in accordance with the EMF so-produced to maintain the latter at a value at which the caustic soda solution becomes colorless.

2. The method of decolorizing a stream of concentrated aqueous solution of electrolytic caustic soda produced in diaphragm cells which comprises mixing with the stream an aqueous solution of a soluble hypochlorite, flowing the resulting mixture of the caustic soda solution and the hypochlorite solution into contact with an electrode of tungsten and a reference electrode so as to produce an EMF between these electrodes which decreases as the concentration of the hypochlorite increases, and regulating the rate of addition of the hypochlorite to the stream in accordance with the EMF so-produced to maintain the latter at a value at which the said resulting mixture becomes colorless.

3. In a method of decolorizing concentrated aqueous caustic soda solution, produced by concentrating the cell liquor of diaphragm type chlorine-caustic soda cells, by mixing with the caustic soda solution a solution of a soluble hypochlorite, the step which consists in controlling the introduction of the solution of the soluble hypochlorite in accordance with the EMF produced between an electrode of tungsten and a standard calomel half cell dipping into the hypochlorite treated caustic soda so as to obtain an EMF reading in the range of EMF at which the hypochlorite just decolorizes the caustic soda solution.

4. In a process of decolorizing concentrated electrolytic caustic soda solution which becomes colored on being concentrated wherein sodium hypochlorite is added to decolorize the caustic soda solution, the method of regulating the rate of addition of the sodium hypochlorite which comprises measuring the EMF produced between a tungsten electrode and a calomel half cell having a saturated KCl electrolyte immersed in the said caustic soda solution, and adding a solution of sodium hypochlorite to the said caustic soda solution until the EMF so-measured is between about 0.895 and 0.930 volt.

5. In a process of decolorizing concentrated electrolytic caustic soda solution which becomes colored on being concentrated wherein sodium hypochlorite is employed in the caustic soda to decolorize the same, the hypochlorite being produced in situ by adding chlorine to the caustic soda solution, the method of regulating the concentration of the sodium hypochlorite produced in situ which comprises measuring the EMF produced between an electrode of tungsten and a reference electrode dipping into the treated caustic soda solution so as to obtain an EMF reading in the range of EMF at which the caustic soda solution just becomes colorless.

WALLIS R. BENNETT.
CLAUDE A. CUMMINS.

REFERENCES CITED

The following references are of record in the file of this patent:

UNITED STATES PATENTS

| Number | Name | Date |
| --- | --- | --- |
| 2,076,964 | Pomeroy | Apr. 13, 1937 |

OTHER REFERENCES

"Journal of American Chemical Society," vol. 52 (1930), pages 2773 thru 2776.

"Zeitschrift fur Elektrochemie," vol. 31 (1925), pages 323 thru 331.